(12) United States Patent
Wang et al.

(10) Patent No.: US 9,001,834 B2
(45) Date of Patent: Apr. 7, 2015

(54) COMMUNICATION TRANSMISSION METHODS AND SYSTEMS

(71) Applicant: VIA Telecom, Inc., San Diego, CA (US)

(72) Inventors: Guotong Wang, Beijing (CN); Anthony Lee, San Diego, CA (US)

(73) Assignee: VIA Telecom Co., Ltd., George Town, Grand Cayman (KY)

( * ) Notice: Subject to any disclaimer, the term of this patent is extended or adjusted under 35 U.S.C. 154(b) by 83 days.

(21) Appl. No.: 13/739,121

(22) Filed: Jan. 11, 2013

(65) Prior Publication Data

US 2013/0182642 A1   Jul. 18, 2013

Related U.S. Application Data

(60) Provisional application No. 61/585,670, filed on Jan. 12, 2012, provisional application No. 61/619,852, filed on Apr. 3, 2012.

(51) Int. Cl.
*H04L 12/28* (2006.01)
*H04W 48/08* (2009.01)
*H04W 48/12* (2009.01)

(52) U.S. Cl.
CPC .............. *H04W 48/08* (2013.01); *H04W 48/12* (2013.01)

(58) Field of Classification Search
CPC ..... H04W 48/08; H04W 48/12; H04W 80/04; H04W 8/26; H04L 47/6225; H04L 2012/5679; H04L 47/50; H04L 47/623; H04L 12/56; H04L 2012/56
USPC ......... 370/349, 322, 326, 329, 330, 341, 348, 370/395.42
See application file for complete search history.

(56) References Cited

U.S. PATENT DOCUMENTS

| | | | | | |
|---|---|---|---|---|---|
| 5,532,702 | A | * | 7/1996 | Mintz | 342/463 |
| 5,935,218 | A | * | 8/1999 | Beyda et al. | 709/251 |
| 6,112,101 | A | * | 8/2000 | Bhatia et al. | 455/512 |
| 8,463,282 | B2 | * | 6/2013 | Attar et al. | 455/453 |

* cited by examiner

*Primary Examiner* — Brenda H Pham
(74) *Attorney, Agent, or Firm* — McClure, Qualey & Rodack, LLP

(57) ABSTRACT

Communication transmission methods and systems are provided. Firstly, a base station broadcasts a message to a user equipment, wherein the message includes a priority threshold value. Then, the user equipment compares a priority value of the user equipment with the priority threshold value. Then, an initiation of an access procedure of the user equipment is disabled when the priority value of the user equipment is below the priority threshold value.

19 Claims, 6 Drawing Sheets

COMMUNICATION TRANSMISSION METHODS AND SYSTEMS

CROSS REFERENCE TO RELATED APPLICATIONS

This Application claims priority of U.S. Provisional Patent Application No. 61/585,670, filed on Jan. 12, 2012 and U.S. Provisional Patent Application No. 61/619,852, filed on Apr. 3, 2012, the entirety of which is incorporated by reference herein.

BACKGROUND OF THE INVENTION

1. Field of the Invention

The disclosure is related to communication transmission systems and methods, and, more particularly, to systems and methods having equipment that can determine whether an access is being performed with a base station according to priority information.

2. Description of the Related Art

Wireless communication systems have been widely deployed to provide various telecommunication services such as telephony, video, data, messaging, and broadcast services. Typical wireless communication systems may employ multiple-access technologies capable of supporting communications with multiple users by sharing available system resources (e.g., bandwidth, transmit power). Examples of such multiple-access technologies include code division multiple access (CDMA) systems, time division multiple access (TDMA) systems, frequency division multiple access (EDAM) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is the Long Term Evolution (LTE) standard. LTE is a set of enhancements to the Universal Mobile Teletransmissions? System (UMTS) mobile standard promulgated by the Third Generation Partnership Project (3GPP). It is designed to better support mobile broadband Internet access by improving spectral efficiency, lowering costs, improving services, making use of new spectrums, and having better integration with other open standards using OFDMA on downlinks (DL), and SC-FDMA on uplinks (UL), and multiple-input multiple-output (MIMO) antenna technology.

Traditionally, a user equipment must complete the access procedure for the access control result, of whether the user equipment is allowed to initiate access or block access. Therefore, unnecessary procedures for access attempts which should be blocked can not be avoided.

BRIEF SUMMARY OF THE INVENTION

Communication transmission systems and methods are provided to overcome the above mentioned problems.

An embodiment of the invention provides a communication transmission method, comprising: broadcasting, by a base station, a message to a user equipment, wherein the message includes a priority threshold value; comparing, by the user equipment, a priority value of the user equipment with the priority threshold value; and disabling an initiation of an access procedure of the user equipment when the priority value of the user equipment is below the priority threshold value.

An embodiment of the invention provides a communication transmission method for a base station, comprising: broadcasting a message to a plurality of user equipment, wherein the message includes a priority threshold value and different waiting durations for each of the user equipment; and adjusting the priority threshold value according to a loading status in the base station, wherein the access procedures of the plurality of user equipment are initiated according to the waiting durations when the priority threshold value is adjusted to be less than the priority values of the plurality of user equipment.

An embodiment of the invention provides a communication transmission method for a user equipment comprising: receiving a message from a base station, wherein the message includes a priority threshold value and a wait time value; comparing a priority value of the user equipment with the priority threshold value; and disabling an initiation of an access procedure of the user equipment when the priority value of the user equipment is below the priority threshold value.

An embodiment of the invention provides a communication transmission system, comprising: a base station, configured to broadcast a message, wherein the message includes a priority threshold value; and a user equipment, configured to receive the message and compare a priority value of the user equipment with the priority threshold value, wherein the user equipment disables an initiation of an access procedure of the user equipment, when the priority value of the user equipment is below the priority threshold value.

An embodiment of the invention provides a base station, comprising: a broadcasting unit, configured to broadcast a message to a plurality of user equipment, wherein the message includes a priority threshold value and different waiting durations for each of the plurality of user equipment; and an adjusting unit, configured to adjust the priority threshold value according to a loading status, wherein the access procedures of the user equipment are initiated according to the waiting durations when the priority threshold value is adjusted to be less than the priority values of the user equipment.

An embodiment of the invention provides a user equipment, comprising: a receiving unit, configured to receive a message from a base station, wherein the message includes a priority threshold value and a wait time value; a comparing unit, configured to compare a priority value of the user equipment with the priority threshold value; and a processing unit, configured to disable an initiation of an access procedure of the user equipment, when the priority value of the user equipment is below the priority threshold value.

Other aspects and features of the invention will become apparent to those with ordinary skill in the art upon review of the following descriptions of specific embodiments of communication transmission methods and systems.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
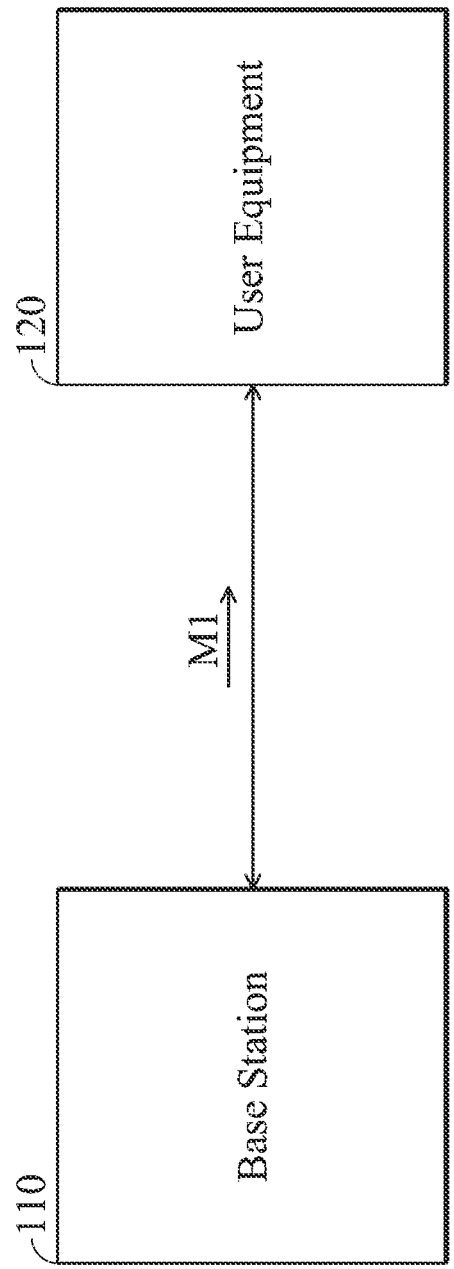
FIG. 1 is a schematic diagram illustrating a communication transmission system 100 according to an embodiment of the invention.

FIG. 1 is a schematic diagram illustrating a communication transmission system 100 according to an embodiment of the invention. In this embodiment, the communication transmission system 100 comprises a base station 110 and user equipment (UE) 120.

The base station 110 may be a fixed station or access network used for communicating with the terminals and may also be referred to as an access point, a Node B, an enhanced base station, an eNodeB (eNB), or some other terminology.

Various embodiments are described herein in connection with the user equipment 120. A wireless terminal can refer to a device providing voice and/or data connectivity to a user. The user equipment 120 can be connected to a computing device such as a laptop computer or desktop computer, or it can be a self contained device such as a personal digital assistant (PDA). The user equipment 120 can also be called a system, subscriber unit, subscriber station, mobile station, mobile, remote station, access point, remote terminal, access terminal, user terminal, user agent, or user device. The user equipment 120 can be a subscriber station, wireless device, cellular telephone, PCS telephone, cordless telephone, Session Initiation Protocol (SIP) phone, wireless local loop (WLL) station, personal digital assistant (PDA), handheld device having wireless connection capability, or other processing devices connected to a wireless modem.

As shown in FIG. 1, the base station 110 is configured to broadcast a message M1, wherein the message M1 includes a priority threshold value.

The user equipment 120 is configured to receive the message M1 and compare a priority value of the user equipment 120 with the priority threshold value for determining whether to process an initiation of an access procedure of the user equipment 120. In one embodiment, the user equipment 120 disables an initiation of an access procedure of the user equipment 120, when the priority value of the user equipment 120 is below the priority threshold value. For example, an initiation of an access procedure of the user equipment 120 should be blocked when the priority value of the user equipment 120 is below the priority threshold value, and the access procedure of the user equipment 120 is initiated by the user equipment 120 when the priority value of the user equipment 120 exceeds the priority threshold value. For example, the user equipment 120 will process normal access procedures when the priority value of the user equipment 120 exceeds the priority threshold value. For example, if the priority threshold value is 3, the user equipment 120 disables an initiation of an access procedure of the user equipment 120 when the priority value of the user equipment 120 is below 3 (such as 1 or 2), and the access procedure of the user equipment 120 is initiated by the user equipment 120 when the priority value of the user equipment 120 exceeds such as 5 or 6).

In an embodiment of the invention, the priority threshold value is adjusted by the base station 110 according to a loading status in the base station. If the loading status in the base station 110 is heavy, the base station 110 may adjust the priority threshold value to higher value, and if the loading status in the base station 110 is light, the base station 110 may adjust the priority threshold value to lower value.

In an embodiment of the invention, the message M1 further includes a waiting duration, and when the priority threshold value is adjusted to be less than the priority value of the user equipment 120, the access procedure of the user equipment 120 is performed by the user equipment 120 after the waiting duration. In an embodiment of the invention, the waiting duration is set by the base station 110. In an embodiment of the invention, the waiting duration is a random value. In an embodiment of the invention, the base station 110 sets the waiting duration according to different delay tolerant ranges. For example, DT_PSIST(0) is applied for a low delay tolerant (0<waiting duration≤2 seconds); DT_PSIST(1) is applied for a medium delay tolerant (2<waiting duration≤60 seconds); DT_PSIST(2) is applied for a long delay tolerant (1 minute<waiting duration≤1 hour); DT_PSIST(3) is applied for a extremely long delay tolerant (waiting duration>1 seconds).

Figure 2A:
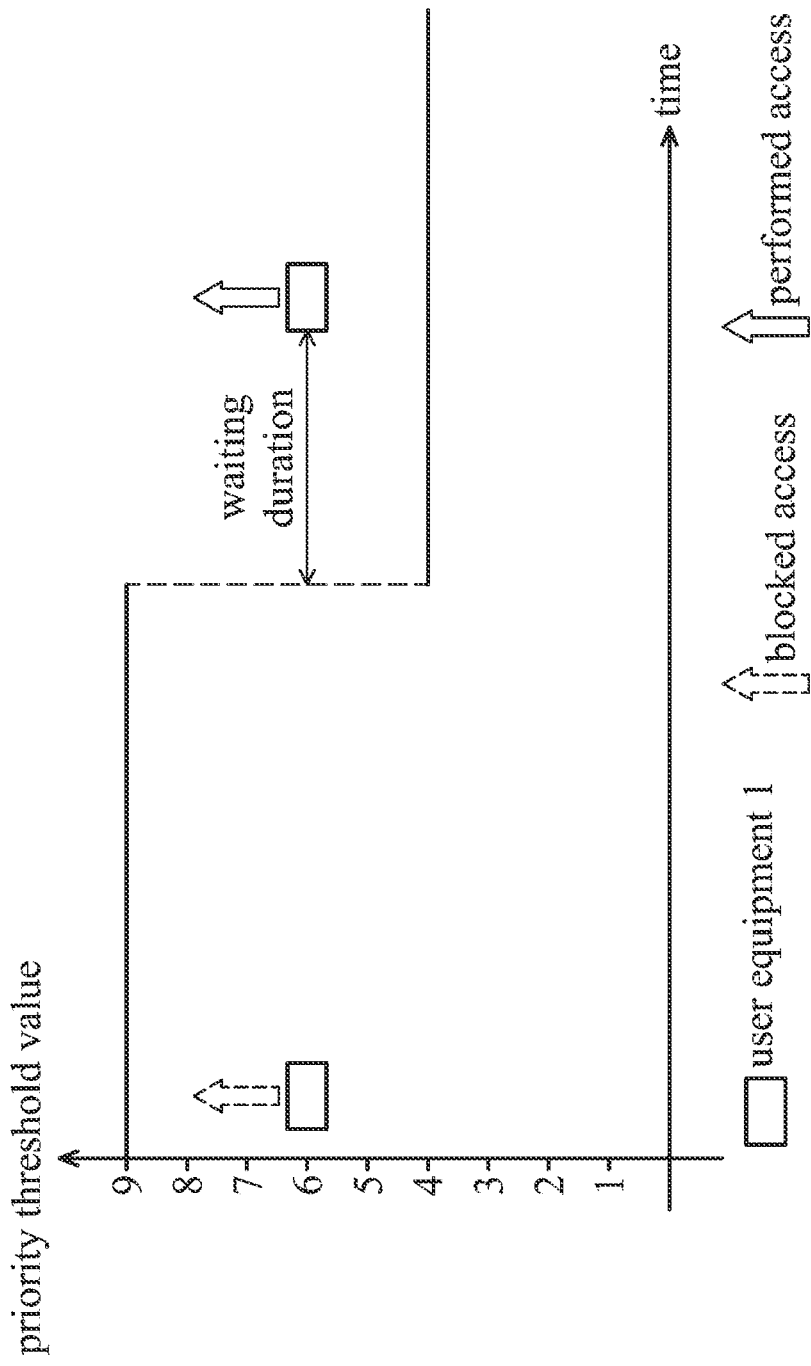
FIG. 2A is a schematic diagram illustrating the waiting duration when the priority threshold value is adjusted to be less than the priority value of the user equipment according to an embodiment of the invention.
Figure 2B:
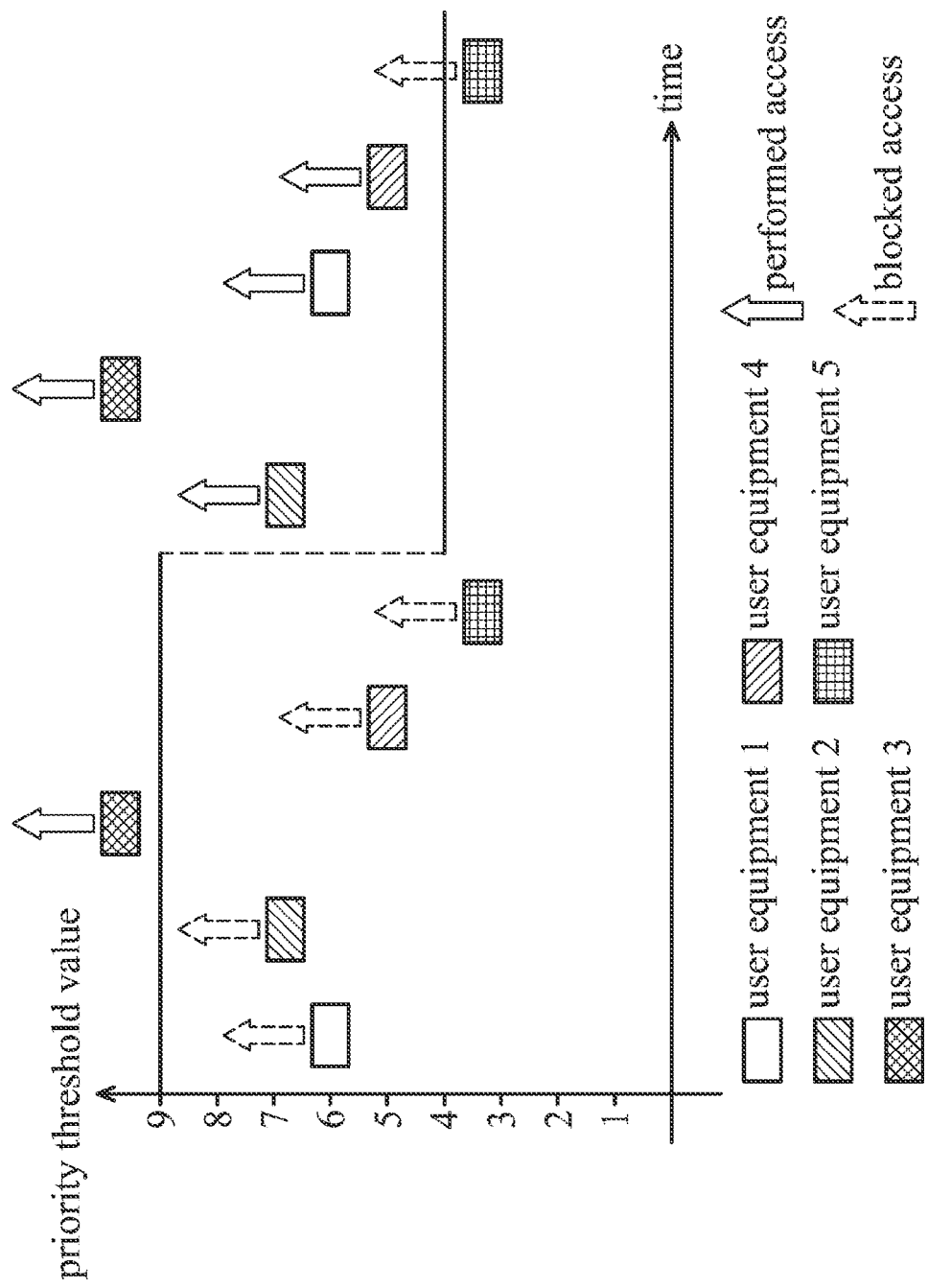
FIG. 2B is a schematic diagram illustrating the waiting durations when the priority threshold value is adjusted to be less than the priority value of the user equipment 1-5 according to an embodiment of the invention.

FIG. 2A is a schematic diagram illustrating the waiting duration when the priority threshold value is adjusted to be less than the priority value of the user equipment according to an embodiment of the invention. In FIG. 2A, when the priority threshold value is 9, the priority value of the user equipment 1 is below the priority threshold value, and when the priority threshold value is 4, the priority value of the user equipment 1 exceeds the priority threshold value. Therefore, when the priority threshold value is adjusted from 9 to 4, the access procedure of the user equipment 1 is performed after the waiting duration. FIG. 2B is a schematic diagram illustrating the waiting durations when the priority threshold value is adjusted to be less than the priority value of the user equipment 1-5 according to an embodiment of the invention, wherein each of the user equipment 1-5 has different waiting durations and the waiting durations are random values set by the base station 110. In FIG. 2B when the priority threshold value is 9, the priority value of the user equipment 1, 4, and 5 are below the priority threshold value, and when the priority threshold value is 4, the priority value of the user equipment 1, 2, 3, and 4 exceed the priority threshold value. Therefore, when the priority threshold value is adjusted from 9 to 4, the access procedures of the user equipment 1, 2, 3, and 4 are performed after the different waiting durations. The priority value of the user equipment 4 always exceeds the priority threshold value. Therefore, the access procedure of the user equipment 4 is always performed. Also, the priority value of the user equipment 5 is still below the priority threshold value, therefore the access procedure of the user equipment 5 is still blocked. Specially speaking, those who are skilled in this technology can understand that all of the disclosed aspects in the invention can be applied for different numbers of user equipment.

In an embodiment of the invention, the priority threshold value can be included in the AccessParameters message. The AccessParameters message is a 4 bit parameter for setting the priority threshold value. The value of the AccessParameters message can be updated according to the load status in the base station 110. In an embodiment of the invention, the user equipment 120 connected to the base station 110 can continuously check the AccessParameters message. In the above embodiment of the invention, if the priority threshold value is adjusted to a higher value due to the heavy loading status in the base station 110 and the priority threshold value is adjusted to be higher than the priority value of the user equipment 120, the user equipment 120 closes the connection with the base station 110.

In another embodiment of the invention, the priority threshold value can be included in the QuickConfig or SectorParameters message. The QuickConfig or SectorParameters message is a 4 bit parameter for setting the priority threshold value. The value of the QuickConfig or SectorParameters message can be updated according to the load status in the base station 110. In an embodiment of the invention, the user equipment 120 connected to the base station 110 can continuously check QuickConfig SectorParameters message. In the above embodiment of the invention, if the priority threshold value is adjusted to a higher value due to the heavy loading status in the base station 110 and the priority threshold value is adjusted to be higher than the priority value of the user equipment 120, the user equipment 120 closes the connection with the base station 110.

In an embodiment of the invention, the base station 110 monitors the load on the access channel. When congestion on the access channel occurs, the base station 110 advertises a 3 bit network access priority (NAP) level in the Access Parameters Message (APM), and when there is no congestion on the access channel, the base station 110 uses a 1 bit network overload indicator (NOI) in the Access Parameters Message (APM) to indicate the access priority control is off. For example, the access priority control mechanism in the invention is not enabled. In an embodiment of the invention, the base station 110 also adjusts the aPersistence value for the class ACCOLC15 in the Access Overload Control (AC-COLC) when the bits network access priority (NAP) is changed.

In an embodiment of the invention, the base station 110 comprises a broadcasting, unit and an adjusting unit. The broadcasting unit is configured to broadcast a message to a plurality of user equipment, wherein the message includes a priority threshold value and different waiting durations for each of the plurality of user equipment. The adjusting unit is configured to adjust the priority threshold value according to a loading status, wherein the access procedures of the user equipment are initiated according to the waiting durations when the priority threshold value is adjusted to be less than the priority values of the user equipment.

In an embodiment of the invention, user equipment 120 comprises a receiving a comparing and a processing unit. The receiving unit is configured to receive a message from a base station 110, wherein the message includes a priority threshold value and a wait time value. The comparing unit is configured to compare a priority value of the user equipment with the priority threshold value. The processing unit is configured to disable an initiation of an access procedure of the user equipment, when the priority value of the user equipment is below the priority threshold value.

Figure 3:
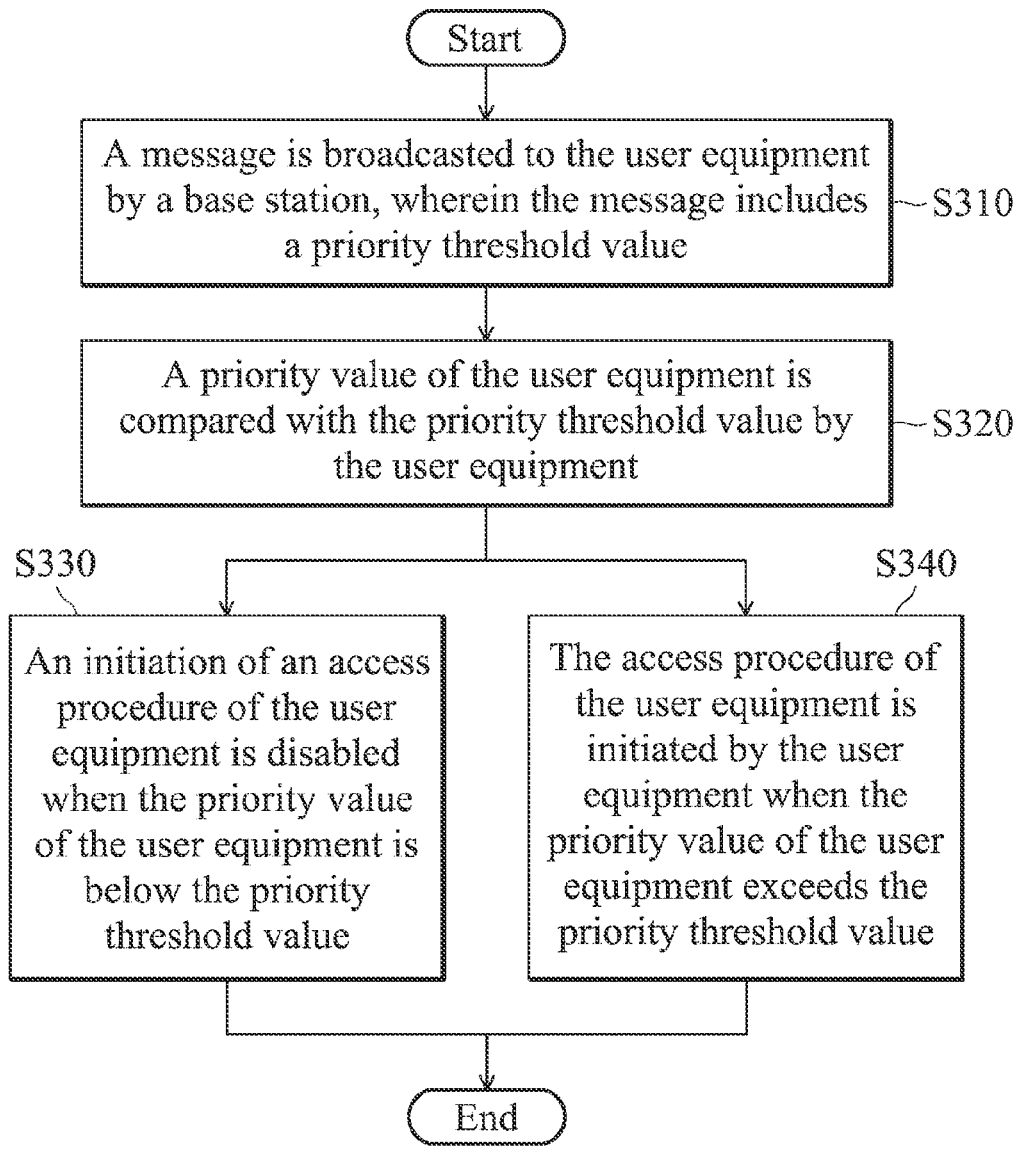
FIG. 3 is a flowchart of a communication transmission method according to an embodiment of the invention.

FIG. 3 is a flowchart of a communication transmission method according to an embodiment of the invention. According to the embodiment, the communication transmission method is configured to be applied in a user equipment such as a computer and portable device such as a tablet computer, Personal Digital Assistant (PDA), smart phone, mobile phone, mobile Internet device, or notebook. Firstly, in step S310, a message is broadcasted to the user equipment by a base station, wherein the message includes a priority threshold value. In step S320, a priority value of the user equipment is compared with the priority threshold value by the user equipment. An initiation of an access procedure of the user equipment is disabled when the priority value of the user equipment is below the priority threshold value (in step S330). The access procedure of the user equipment is initiated by the user equipment when the priority value of the user equipment exceeds the priority threshold value (in step S340). In an embodiment of the invention, the priority threshold value is adjusted by the base station according to a loading status in the base station. In an embodiment of the invention, the message further includes a waiting duration, and when the priority threshold value is adjusted to be less than the priority value of the user equipment, the access procedure of the user equipment is performed by the user equipment after the waiting duration. In an embodiment of the invention, the waiting duration is set by the base station. In an embodiment of the invention, the waiting duration is a random value.

Figure 4:
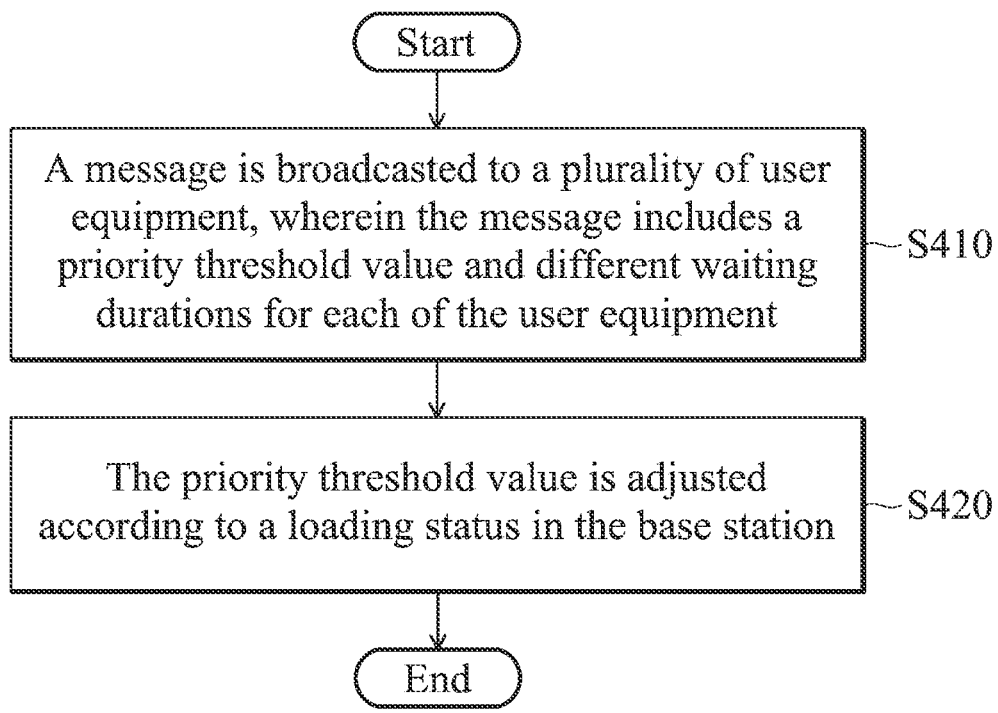
FIG. 4 is a flowchart of a communication transmission method for a base station according to an embodiment of the invention.

FIG. 4 is a flowchart of a communication transmission method for a base station according to an embodiment of the invention. Firstly, in step S410, a message is broadcasted to a plurality of user equipment, wherein the message includes a priority threshold value and different waiting durations for each of the user equipment. Then, in step S420, the priority threshold value is adjusted according to a loading status in the base station, wherein the access procedures of the plurality of user equipment are initiated according to the waiting durations when the priority threshold value is adjusted to be less than the priority values of the plurality of user equipment. In an embodiment of the invention, the waiting durations are set by the base station. In an embodiment of the invention, the waiting durations are different random values.

Figure 5:
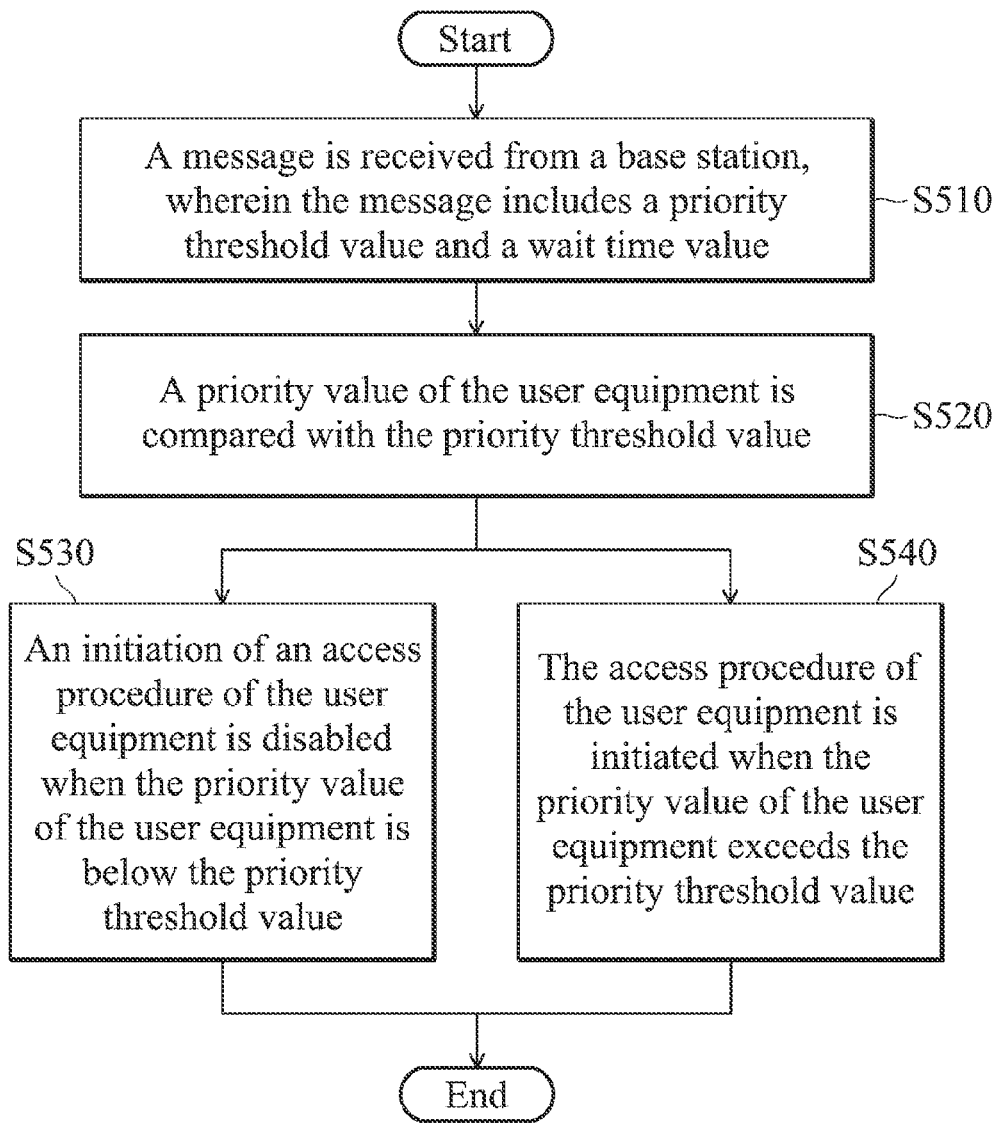
FIG. 5 is a flowchart of a communication transmission method for a user equipment according to an embodiment of the invention.

FIG. 5 is a flowchart of a communication transmission method for a user equipment according to an embodiment of the invention. Firstly, in step S510, a message is received from a base station, wherein the message includes a priority threshold value and a wait time value. In step S520, a priority value of the user equipment is compared with the priority threshold value. An initiation of an access procedure of the user equipment is disabled when the priority value of the user equipment is below the priority threshold value in step S530). The access procedure of the user equipment is initiated when the priority value of the user equipment exceeds the priority threshold value (in step S540).

Therefore, in the method of the communication transmission described in connection with the aspects disclosed herein, user equipment can compare priority values with the priority threshold value and the priority threshold value can be adjusted based on the loading status in base station. Therefore, unnecessary procedures for the access attempts which should be blocked can be avoided.

The steps of the method described in connection with the aspects disclosed herein may be embodied directly in hardware, in a software module executed by a processor, or in a combination of the two. A software module (e.g., including executable instructions and related data) and other data may reside in a data memory such as a RAM memory, flash memory, ROM memory, EPROM memory, EEPROM memory, register, hard disk, removable disk, CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in the user equipment. Alternatively, the processor and the storage medium may reside as discrete components in the user equipment. Moreover, in some aspects any suitable computer-program product may comprise a computer-readable medium comprising codes relating to one or more of the aspects of the disclosure. In some aspects a computer program product may comprise packaging materials.

The above paragraphs describe many aspects. The teaching of the invention can be accomplished by many methods, and any specific configurations or functions in the disclosed embodiments only present a representative condition. Those who are skilled in this technology can understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communication transmission method, comprising:
   broadcasting, by a base station, a message to a user equipment, wherein the message includes a priority threshold value;
   comparing, by the user equipment, a priority value of the user equipment with the priority threshold value; and
   disabling an initiation of an access procedure of the user equipment when the priority value of the user equipment is below the priority threshold value,
   wherein the priority threshold value is adjusted by the base station according to a loading status in the base station,
   wherein the message further includes a waiting duration, and when the priority threshold value is adjusted to be less than the priority value of the user equipment, the access procedure of the user equipment is performed by the user equipment after the waiting duration.

2. The communication transmission method of claim 1, further comprising:
   initiating, by the user equipment, the access procedure of the user equipment when the priority value of the user equipment exceeds the priority threshold value.

3. The communication transmission method of claim 1, wherein the waiting duration is set by the base station.

4. The communication transmission method of claim 1, wherein the waiting duration is a random value.

5. A communication transmission method for a base station, comprising:
   broadcasting a message to a plurality of user equipment, wherein the message includes a priority threshold value and a plurality of waiting durations for each of the user equipment; and
   adjusting the priority threshold value according to a loading status in the base station,
   wherein the access procedures of the plurality of user equipment are initiated according to the waiting durations when the priority threshold value is adjusted to be less than the priority values of the plurality of user equipment.

6. The communication transmission method of claim 5, wherein the waiting durations are set by the base station.

7. The communication transmission method of claim 5, wherein the waiting durations are different random values.

8. A communication transmission method for a user equipment comprising:
   receiving a message from a base station, wherein the message includes a priority threshold value and a wait duration;
   comparing a priority value of the user equipment with the priority threshold value; and
   disabling an initiation of an access procedure of the user equipment when the priority value of the user equipment is below the priority threshold value,
   wherein the access procedures of the user equipment are initiated according to the waiting duration when the priority threshold value is adjusted to be less than the priority values of the user equipment by the base station.

9. The communication transmission method of claim 8, further comprising:
   initiating the access procedure of the user equipment when the priority value of the user equipment exceeds the priority threshold value.

10. A communication transmission system, comprising:
    a base station, configured to broadcast a message, wherein the message includes a priority threshold value; and
    a user equipment, configured to receive the message and compare a priority value of the user equipment with the priority threshold value,
    wherein the user equipment disables an initiation of an access procedure of the user equipment, when the priority value of the user equipment is below the priority threshold value,
    wherein the priority threshold value is adjusted by the base station according to a loading status in the base station,
    wherein the message further includes a waiting duration, and when the priority threshold value is adjusted to be less than the priority value of the user equipment, the access procedure of the user equipment is performed by the user equipment after the waiting duration.

11. The communication transmission system of claim 10, wherein the access procedure of the user equipment is initiated by the user equipment when the priority value of the user equipment exceeds the priority threshold value.

12. The communication transmission system of claim 10, wherein the priority threshold value is adjusted by the base station according to a loading status in the base station.

13. The communication transmission system of claim 10, wherein the waiting duration is set by the base station.

14. The communication transmission system of claim 10, wherein the waiting duration is a random value.

15. A base station, comprising:
    a broadcasting unit, configured to broadcast a message to a plurality of user equipment, wherein the message includes a priority threshold value and different waiting durations for each of the plurality of user equipment; and
    an adjusting unit, configured to adjust the priority threshold value according to a loading status,
    wherein the access procedures of the user equipment are initiated according to the waiting durations when the priority threshold value is adjusted to be less than the priority values of the user equipment.

16. The base station of claim 15, wherein the waiting durations are set by the base station.

17. The base station of claim 15, wherein the waiting durations a plurality of random values.

18. A user equipment, comprising:
a receiving unit, configured to receive a message from a base station, wherein the message includes a priority threshold value and a wait time value;
a comparing unit, configured to compare a priority value of the user equipment with the priority threshold value; and
a processing unit, configured to disable an initiation of an access procedure of the user equipment, when the priority value of the user equipment is below the priority threshold value,
wherein the access procedures of the user equipment are initiated according to the waiting duration when the priority threshold value is adjusted to be less than the priority values of the user equipment by the base station.

19. The user equipment of claim 18, wherein the access procedure of the user equipment is initiated when the priority value of the user equipment exceeds the priority threshold value.

* * * * *